(12) United States Patent
Mergl et al.

(10) Patent No.: US 12,365,277 B2
(45) Date of Patent: Jul. 22, 2025

(54) MANUALLY AND ELECTRICALLY ADJUSTABLE DEVICE

(71) Applicant: Brose Fahrzeugteile SE & Co. Kommanditgesellschaft, Coburg, Coburg (DE)

(72) Inventors: Christian Mergl, Zeil/Main (DE); Wojciech Falinski, Coburg (DE); Marcel Schieber, Weidhausen bei Coburg (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 453 days.

(21) Appl. No.: 17/770,665

(22) PCT Filed: Oct. 20, 2020

(86) PCT No.: PCT/EP2020/079496
§ 371 (c)(1),
(2) Date: Apr. 21, 2022

(87) PCT Pub. No.: WO2021/078737
PCT Pub. Date: Apr. 29, 2021

(65) Prior Publication Data
US 2022/0371494 A1    Nov. 24, 2022

(30) Foreign Application Priority Data

Oct. 25, 2019  (DE) ...................... 10 2019 216 493.5
Jan. 24, 2020  (DE) ...................... 10 2020 200 867.1

(51) Int. Cl.
*B60N 2/75* (2018.01)
*B60N 2/90* (2018.01)
*B60R 16/037* (2006.01)

(52) U.S. Cl.
CPC ............. *B60N 2/773* (2018.02); *B60N 2/763* (2018.02); *B60N 2/79* (2018.02); *B60N 2/793* (2018.02); *B60N 2/919* (2018.02); *B60R 16/037* (2013.01); *B60N 2002/924* (2018.02); *B60N 2002/952* (2018.02)

(58) Field of Classification Search
None
See application file for complete search history.

(56) References Cited

U.S. PATENT DOCUMENTS 11,884,229 B1 *   1/2024  Faruque ................. B60R 7/04
2005/0248170 A1 * 11/2005  Kawamoto ............ B60N 2/793
                                                        296/24.34

(Continued)

FOREIGN PATENT DOCUMENTS

CN    107487245 A    12/2017
DE      4135279 A1    4/1993

(Continued)

*Primary Examiner* — Philip F Gabler
(74) *Attorney, Agent, or Firm* — Dickinson Wright PLLC (57) ABSTRACT

A rest device for a vehicle, including a support and an element that adjustable relative to the support. In addition, a drive unit including a drive motor is provided, which can be activated for the motor-driven adjusting of the element relative to the support, the drive unit being designed such that the element can be adjusted relative to the support both manually and using a motor.

13 Claims, 7 Drawing Sheets

(56) References Cited

U.S. PATENT DOCUMENTS

| | | | | |
|---|---|---|---|---|
| 2007/0236036 | A1* | 10/2007 | Downey | B60N 2/793 248/311.2 |
| 2010/0057307 | A1* | 3/2010 | Copeland | E02F 9/2004 701/50 |
| 2010/0066115 | A1* | 3/2010 | Hipshier | B60N 2/793 296/37.8 |
| 2015/0115641 | A1* | 4/2015 | Inoue | B60N 2/793 296/37.8 |
| 2017/0197522 | A1* | 7/2017 | Lopez Pinana | B60N 2/20 |
| 2022/0282543 | A1* | 9/2022 | Elsarelli | B60R 11/00 |
| 2023/0211737 | A1* | 7/2023 | Bösl | F16H 19/04 248/205.1 |
| 2024/0157879 | A1* | 5/2024 | Kling | B60R 7/04 |

FOREIGN PATENT DOCUMENTS

| | | | |
|---|---|---|---|
| DE | 29909044 U1 | 10/1999 | |
| DE | 10038204 A1 | 4/2001 | |
| DE | 102004026928 A1 | 12/2005 | |
| DE | 102004028611 A1 | 12/2005 | |
| DE | 102004030462 A1 | 1/2006 | |
| DE | 102006032271 A1 | 1/2008 | |
| DE | 102007024000 A1 | 11/2008 | |
| DE | 202011106149 U1 | 1/2013 | |
| DE | 102012015725 A1 | 2/2014 | |
| DE | 102012221160 A1 | 5/2014 | |
| DE | 102013100829 A | 8/2014 | |
| DE | 102015109523 A1 | 12/2016 | |
| DE | 102016207524 A1 | 11/2017 | |
| DE | 102017220643 A | 5/2019 | |
| JP | 2010036671 A * | 2/2010 | ............ B60N 2/4686 |
| WO | 2008113458 A2 | 9/2008 | |
| WO | 2009005471 A1 | 1/2009 | |
| WO | 2012075558 A1 | 6/2012 | |
| WO | WO-2016094621 A1 * | 6/2016 | ............ B60N 2/793 |
| WO | WO-2020040767 A1 * | 2/2020 | ............ B60N 2/793 |

* cited by examiner

MANUALLY AND ELECTRICALLY ADJUSTABLE DEVICE

CROSS-REFERENCE TO RELATED APPLICATIONS

This application is the U.S. National Phase of PCT Application No. PCT/EP2020/079496 filed on Oct. 20, 2020, which claims priority to German Patent Application No. DE 10 2019 216 493.5, filed on Oct. 25, 2019 and German Patent Application No. DE 10 2020 200 867.1, filed on Jan. 24, 2020, the disclosures of which are hereby incorporated in their entirety by reference herein.

TECHNICAL FIELD

The present disclosure relates to a rest device for a vehicle.

BACKGROUND

Vehicles may include rest devices of this kind, in particular in the form of an armrest for resting an arm, comprises a carrier and an element that can be adjusted relative to the carrier, in particular in the form of an arm support element.

In the case of adjustable armrests for vehicle seats, it is always desirable to provide the most comfortable adjustability possible, which allows a user to easily find, in many different use situations, a position of the arm support element that is best suited for the user. The situation is similar for storage compartments and the like.

SUMMARY

One or more objects of the present disclosure is to provide a device that can be adjusted as comfortably as possible.

A rest device (for example armrest) is provided. The rest device may include a drive unit having a (electric) drive motor, which can be activated for the motor-driven adjustment of the element (for example arm support element) relative to the carrier, and the drive unit is designed such that it allows selectively both a motor-driven adjustment and a manual adjustment of the element (for example arm support element) relative to the carrier, such that the element (for example arm support element) therefore can be adjusted relative to the carrier both using a motor and manually.

In this way, a motor-driven adjustment can be implemented as necessary, for example triggered by a user input or automatically in certain use situations, and alternatively it is possible to easily adjust the element (for example arm support element) manually. This allows a rest device (for example armrest) that can be operated particularly comfortably and intuitively.

The drive unit is not designed to be self-locking. If the drive motor does not generate any torque, an output shaft of the drive unit is then rotatable, in particular manually. The drive unit optionally includes a transmission. The transmission has a drive shaft and an output shaft and can be driven here both via the drive shaft and via the output shaft. For example, the drive unit comprises a spur gearing or a planetary gearing with a correspondingly low gear reduction, or a worm gear with a pitch angle that is smaller than the effective angle of the friction cone. The element is for example an arm support element and provides a support surface on which a user can rest his arm.

A control unit of the rest device (for example armrest) is optionally provided and designed to effect a short circuit between electrical connections of the drive motor. As an example, the short circuit may be provided by means of a switch, that is to say the rest device (for example armrest) is optionally designed such that the drive motor can be short-circuited. A braking effect and/or a (for example electronically releasable) locking of the drive unit can be produced by means of such a short circuit. Due to the braking effect, the element (for example arm support element) is movable manually relative to the carrier, for example relatively stiffly. In this way, a set position of the element (for example arm support element) can be easily locked, moreover without additional mechanical parts. For example, the drive motor has two electrical poles and the control unit can selectively apply a short circuit to the two poles. In one embodiment, the control unit can change at the two poles between different operating modes, for example, to produce selectively a short circuit, apply a voltage and/or electrically separate the poles. In other words, the control unit can apply a short-circuit brake. At least one force sensor is optionally provided which detects a force acting on the element (for example arm support element), wherein the control unit, upon detection of an effective force (in particular above a specific threshold value), interrupts the short circuit between the electrical connections of the drive motor.

The control unit can be designed to detect a manual adjustment of the element (for example arm support element) relative to the carrier (to detect alternatively or additionally a force acting on the element (for example arm support element)) and, depending thereon, to cancel the short circuit or to change generally between two different operating modes. For example, a manual pressure on the element (for example arm support element) along an adjustment direction relative to the carrier might initially result in no movement or a movement that is hardly noticeable, but in response thereto the control unit releases the short-circuit brake. A smooth manual adjustment is then possible. Alternatively, the control unit in response thereto activates the drive motor and moves the element (for example armrest) in a predefined direction and/or to a predefined position.

The rest device (for example armrest) optionally comprises a sensor device. The sensor device is used for example to detect an adjustment direction and/or an adjustment speed of the element (for example arm support element) relative to the carrier. It can be provided that the control unit, by means of the sensor device, detects a manual adjustment of the element (for example arm support element) and/or a force acting on the element (for example arm support element). Alternatively or additionally, it can be provided that the control unit, by means of the sensor device, detects the current position of the element (for example arm support element) relative to the carrier and/or determines a traveled path during an adjustment, for example in order to set a predefined position. Furthermore, by means of the sensor device, anti-pinch protection can be provided, for example if an adjustment speed that is lower than expected is detected.

In one embodiment, the sensor device comprises at least one, in particular, two Hall sensors. The one or more Hall sensor(s) is/are arranged for example adjacently to a rotatable magnet so that said sensor or sensors can detect the magnetic field changing as a result of the rotation. The Hall sensors are arranged so closely to one another that they can detect both the direction and the speed of the rotation of the magnet. The magnet is, for example, a magnet of the drive motor or a magnet fastened to a shaft, for example the output shaft, or another rotatable part of the drive unit. Hall sensors are particularly robust, small and lightweight and allow simple measurement and evaluation.

The control unit can comprise a memory unit, in particular, for storing an adjustment position of the element (for example arm support element) relative to the carrier. For example, the control unit can read the memory unit and actuate the drive motor depending on data stored in the memory unit, in particular, in such a way that the stored adjustment position is set. The stored adjustment position can be, for example, a position different from an end position, for example a position between two end positions. For example, it is possible to provide a memory function, for example in order to allow personalized settings and/or in order to set, in one or more predetermined use scenarios, an adjustment position optimized for the latter. Here, the position may be a reading position and/or a rest position. Alternatively, the or a stored adjustment position is the last adjustment position set using a motor.

The control unit is optionally designed to set an adjustment position of the element (for example arm support element) relative to the carrier, said adjustment position being stored in the memory unit, by activation of the drive motor depending on a predetermined condition. It is hereby possible to automatically set settings adapted for example to specific situations. The stored adjustment position is for example the last (such as electrically) set position of the element (for example arm support element) relative to the carrier.

In a further development, the predetermined condition is the input of a command, for example by actuation of a button, and/or the expiry of a predetermined time period. For example, a user can set for example a stored setting at the touch of a button or simply by waiting, which is particularly simple in either case.

The control unit is optionally designed to identify a manual adjustment of the element (for example arm support element) relative to the carrier (for example with the aid of a sensor device and/or with the aid of signals read at the connections of the drive motor) and to activate the drive motor in response thereto. In particular, it can be provided that the predetermined condition is the expiry of a predetermined period of time since the identified manual adjustment of the element (for example arm support element) relative to the carrier. For example, a storage compartment closable by the element (for example arm support element) can thus be opened by manual displacement of the element (for example arm support element), wherein the element (for example arm support element) is automatically moved back again into the closed position following the predetermined period of time.

Accordingly, it can be provided that the element (for example arm support element) in at least one position (a closed position) relative to the carrier closes a compartment (for example in carrier) and in at least one other position (an open position) releases the compartment relative to the carrier.

The drive unit can comprise a transmission. The transmission is operatively connected to the drive motor, for example via an input shaft. The transmission has an output shaft which is rotatable (such as manually) when the drive motor is deenergized.

The element (for example arm support element) is adjustable in translation (for example longitudinally) relative to the carrier, for example in order to displace the element (for example arm support element) into a (for example extended) support position and into a (for example retracted) stowing position (depending on the requirement), for example in order to afford a person occupying the seat a greater freedom of movement.

The rest device is optionally formed as an armrest, such as for a vehicle seat or a console. Here, the element is formed as an arm support element.

The arm support element in a further development has an elongate support surface extended longitudinally along a longitudinal axis. The support surface is designed for resting an arm. Here, the arm support element is adjustable relative to the carrier, for example parallel to the longitudinal axis. The arm support element is thus longitudinally adjustable.

The drive unit optionally comprises a toothed rack. For example, a pinion drivable by means of the drive motor engages in the toothed rack. Alternatively, a spindle drive is conceivable, for example.

In accordance with one aspect, an assembly with vehicle seat is provided, which assembly comprises a rest device formed as an armrest in accordance with any embodiment described herein. The armrest is for example mounted on the vehicle seat or arranged next to the vehicle seat, for example can be or is mounted on a vehicle floor next to the vehicle seat. In particular, the armrest is arranged so that a user occupying space on the vehicle seat can rest his arm on the arm support element.

The assembly, in particular the vehicle seat, may include a further adjustment unit that can be adjusted in motor-driven fashion. Here, it can be provided that the control unit is designed to bring about a simultaneous and/or coupled adjustment of the arm support element relative to the carrier and of the further adjustment unit adjustable in motor-driven fashion. For example, the further adjustment unit adjustable in motor-driven fashion is a fitting assembly for adjusting the inclination of a backrest of the vehicle seat relative to a seat part of the vehicle seat or a longitudinal adjustment device of the vehicle seat. In this way, for example the vehicle seat can be set in a rest or reading position, wherein a plurality of components of the vehicle seat are adjusted in order to allow a particularly well-adapted ergonomics, in particular in the case of an autonomously driving vehicle. Alternatively, the further adjustment unit adjustable in motor-driven fashion is a unit distanced from the vehicle seat, for example a display adjuster, an adjustable table, an adjustable component of another vehicle seat or an adjustable component of a vehicle comprising the assembly. For example, the further adjustment unit adjustable in motor-driven fashion is a door opener.

The rest device is optionally formed as a storage compartment, wherein the element is formed as a covering element, which is adjustable relative to the carrier in order to close or release selectively a compartment formed by the carrier. In this way, it is possible to provide a storage compartment that can be opened particularly comfortably and that in addition can be manually opened or closed easily, for example also in the event of a power failure. The carrier is for example part of a vehicle interior trim. Alternatively, the carrier is for example part of a furniture item.

The rest device may be formed as a drawer device, and the element is formed as a drawer element that is adjustable relative to the carrier in order to close or release selectively a compartment formed by the drawer element. It is thus also possible to provide a storage compartment that can be opened and closed particularly comfortably and that can be manually opened or closed easily, even in the event of a power failure. The carrier is for example part of a vehicle interior trim or part of a furniture item.

According to one aspect, an adjustment device is provided, in particular for a rest device according to any embodiment described herein, comprising a carrier and an element that is adjustable relative to the carrier (in particular in translation). The adjustment device comprises a drive unit with a drive motor, which can be activated for the motor-driven adjustment of the element relative to the carrier, wherein the drive unit is designed such that the element can be adjusted (in particular in translation) relative to the carrier both using a motor and manually.

BRIEF DESCRIPTION OF THE DRAWINGS

The concept forming the basis of the invention will be explained in greater detail hereinafter on the basis of the exemplary embodiments shown in the figures. The figures show, in schematic illustrations.

DETAILED DESCRIPTION

An adjustable armrest is described in CN 107487245 A, wherein an arm support element is adjustable longitudinally relative to a carrier by means of a drive motor.

Document DE 10 2007 024 000 A1 discloses a further armrest, which, with the aid of a drive motor, allows comfortably a height adjustment of an arm support element. Here, an intermediate part which is arranged between an arm support and a base part and which is adjustable relative to the base part is provided, whereby a design that is closed in each vertical position of the arm support is made possible between the arm support and the base part. Due to the insertion of the intermediate part between the base part and the arm support, it is possible to integrate a simple, finely adjustable adjustment mechanism with a transfer of small adjustment forces, since the adjustment mechanism can be integrated into the intermediate part.

Figure 1A:
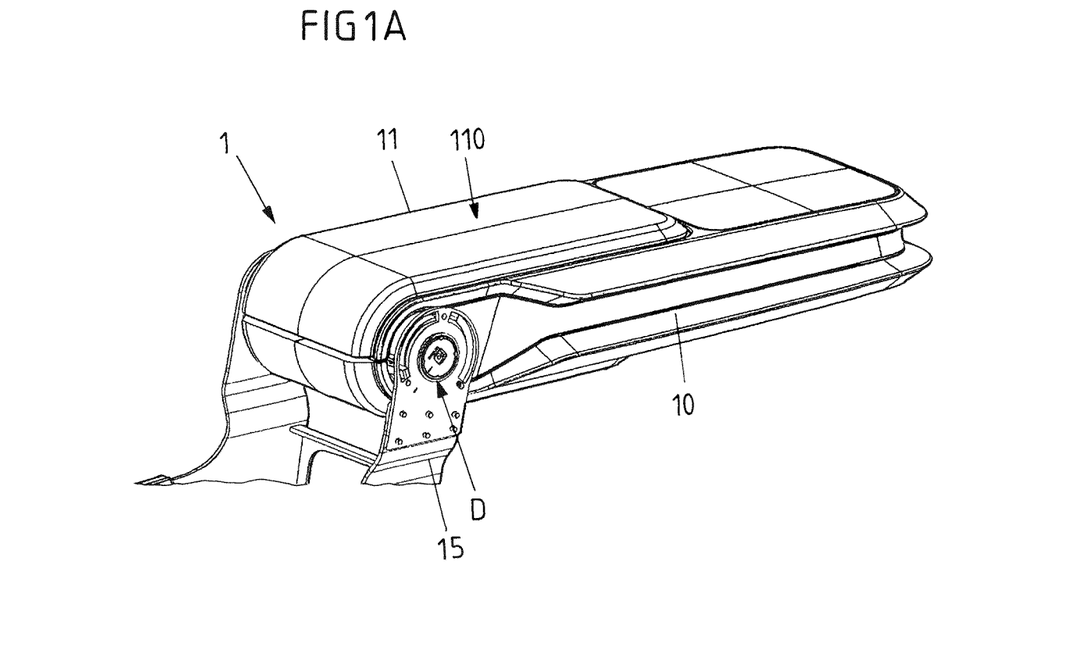
FIG. 1A a rest device in the form of an armrest which has an adapter, a carrier and an arm support element, wherein the arm support element is shown in a retracted position.
Figure 1B:
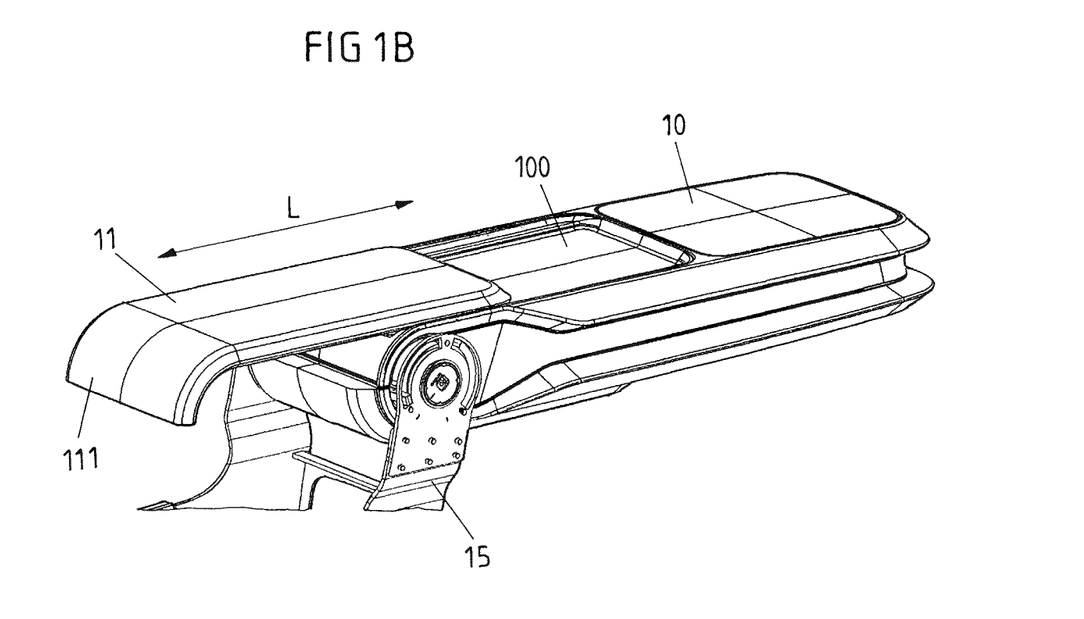
FIG. 1B the armrest according to FIG. 1A, wherein the arm support element is shown in an extended position.

FIG. 1A shows a rest device in the form of an armrest 1 with a carrier 10 and an element movable relative thereto in the form of an arm support element 11. The arm support element 11 is movable relative to the carrier 10 by a user selectively using a motor and manually, in the present case between a retracted position shown in FIG. 1A and an extended position shown in FIG. 1B. The arm support element 11 has a support surface 110, on which the user can rest an arm. By way of an adapter 15, the armrest 1 can be mounted on a vehicle and/or a vehicle seat.

Figure 2:
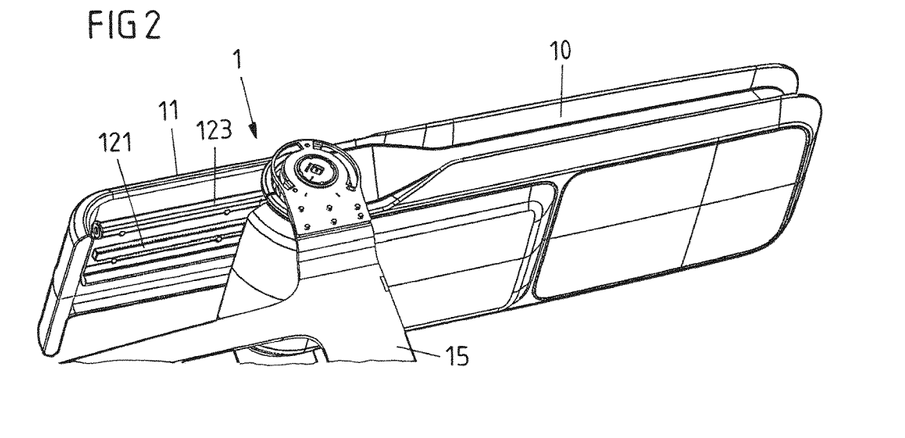
FIG. 2 the armrest according to FIG. 1B in a view from below.
Figure 3:
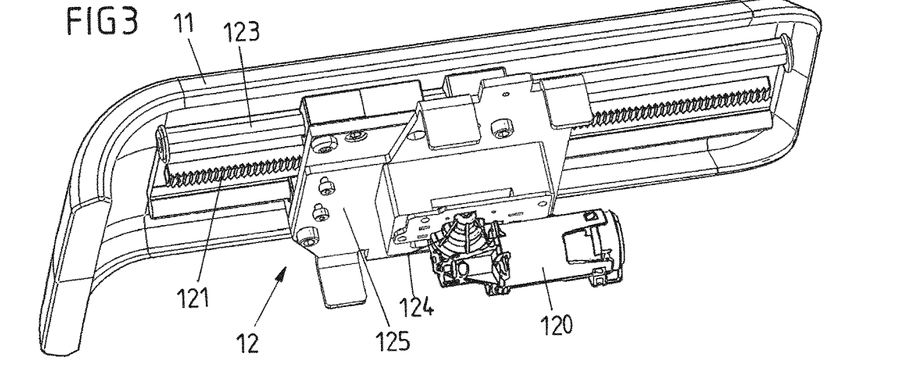
FIG. 3 the arm support element of the armrest according to FIGS. 1A to 2 with a drive unit.
Figure 4:
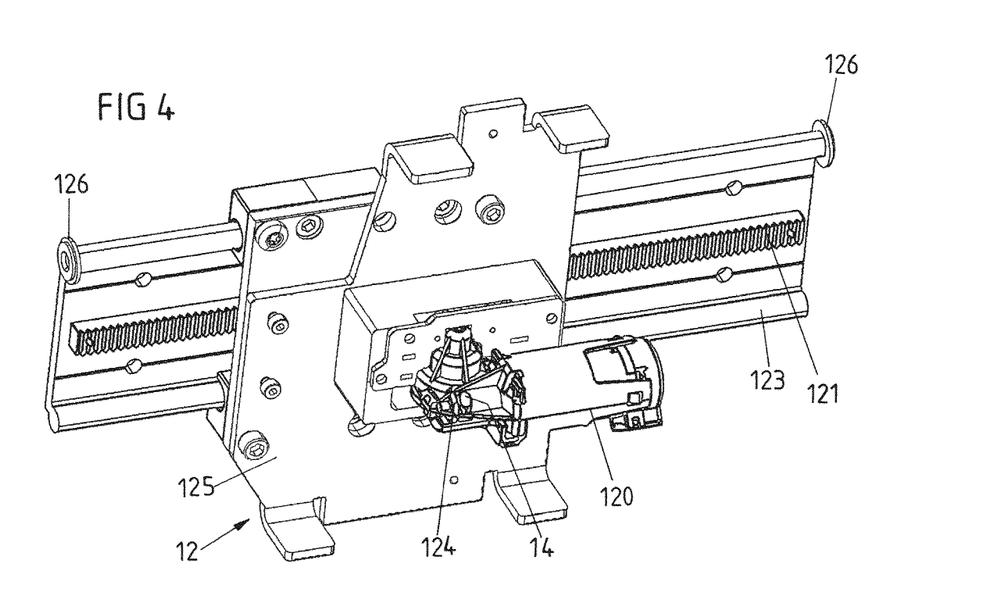
FIG. 4 the drive unit according to FIG. 3.

In order to adjust the arm support element in motor-driven fashion relative to the carrier 10, the armrest 1 comprises a drive unit 12, which is shown for example in FIGS. 2 to 4 and also takes on the task of guiding the arm support element 11 in the event of a manual adjustment.

The drive unit 12 comprises a drive motor 120, which can be activated for motor-driven adjustment of the arm support element 11 relative to the carrier 10. The drive motor 120 in the present case is an electric motor. The drive unit 12 is not designed to be self-locking. For example, it is thus possible that an output shaft of the drive unit 12 is set in rotation (in particular when the drive motor 120 is not active) for example by the action of a manual force on the arm support element 11.

Figure 6:
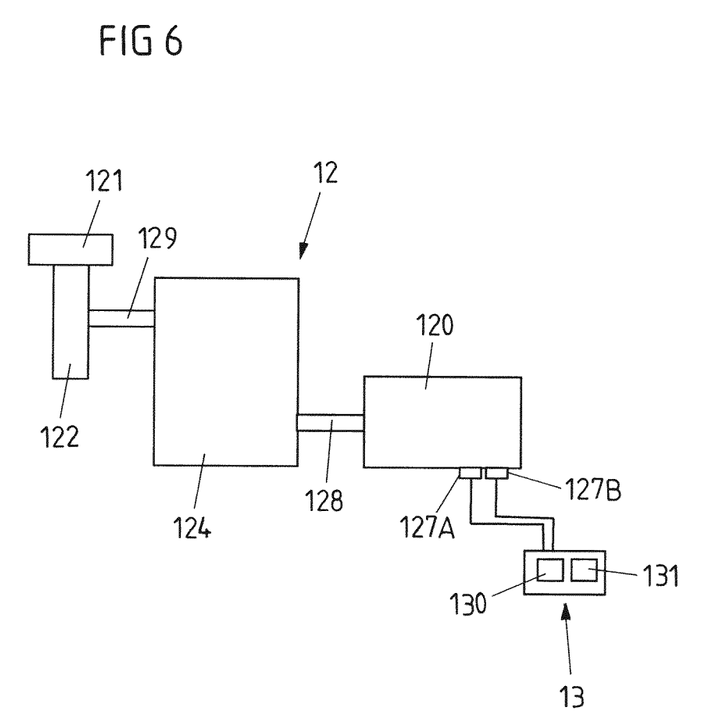
FIG. 6 a drive unit of the armrest according to FIGS. 1A to 5C.

The drive unit 12 also comprises a transmission 124, via which the drive motor 120 is operatively connected to a toothed rack 121, specifically via a pinion 122, which is hidden in FIGS. 2 to 4 and is shown for example in FIG. 6. The toothed rack 121 is longitudinally extended. Parallel to the toothed rack 121, there extends generally at least one guide 123, in the present case two guides 123, between which the toothed rack 121 is arranged. The guides 123, which are formed here as guide rails, are engaged in each case longitudinally displaceably with a slider. The sliders are fastened to a mount 125. The drive motor 120 is also fixedly mounted on the mount 125. The unit with the guides 123 and the toothed rack 121 can thus be moved relative to the mount 125 along a longitudinal axis L (see in particular FIG. 1). The sliders engage around the guides 123 in such a way that the guides cannot be removed from the sliders. End stops 126 delimit the path of displacement in both directions. The end stops 126 are arranged in the present case on one (generally at least one) of the guides 123.

The arm support element 11 is fastened to the unit comprising the guides 123 and the toothed rack 121. The arm support element 11 optionally comprises a padding.

As can be seen in particular, with reference to FIGS. 1A and 1, a compartment 100 in the form of an indentation is formed in the carrier 10 and is covered by the arm support 11 in the retracted position and is released in the extended position. This compartment can optionally be used as a receptacle in which to place objects. Alternatively or additionally, the carrier 10, adjacently to the arm support element 11, comprises one or more further receptacles and/or support surfaces. In the shown example, the carrier 10, besides the arm support element 11 (in the retracted position, see in particular FIG. 1A) also has a surface which can be used as a support surface and/or as a further armrest surface.

In the present case, the arm support element 11 has a curvature 111 and specifically is curved at a longitudinal side end. This allows for good ergonomics. In the retracted state according to FIG. 1A, a surface of the arm support element 11 in the region of the curvature 111 transitions flush into a surface of the carrier 10.

The carrier 10 is mounted on the adapter 15, in the present case on a pivot joint D. The pivot joint D is arranged at a (longitudinal-side end) of the carrier 10. In the shown example, the carrier 10 is thus pivotable relative to the adapter 15 (for example through 180°, in particular, in such a way that the carrier 10 is pivotable selectively into the position folded towards the rear, shown in FIG. 1A and FIG. 1B, and into a position folded towards the front. A plurality of different inclinations of the carrier 10 relative to the adapter 15 can thus be set optionally. For example, in addition to the longitudinal adjustment, a height adjustment of the armrest 1 can be provided.

Figure 5A:
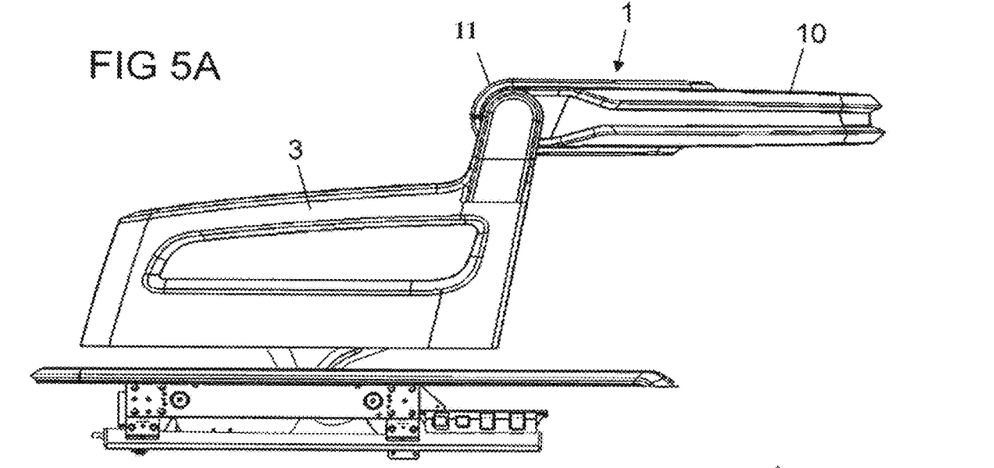
FIGS. 5A to 5C a center console with armrest according to FIGS. 1A to 2, wherein the arm support element is shown in different settings.
Figure 5B:
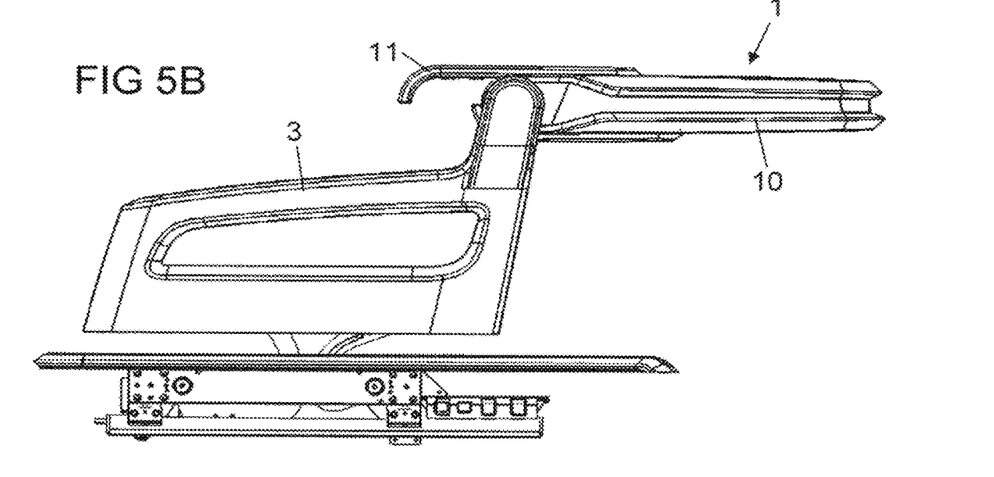
Figure 5C:
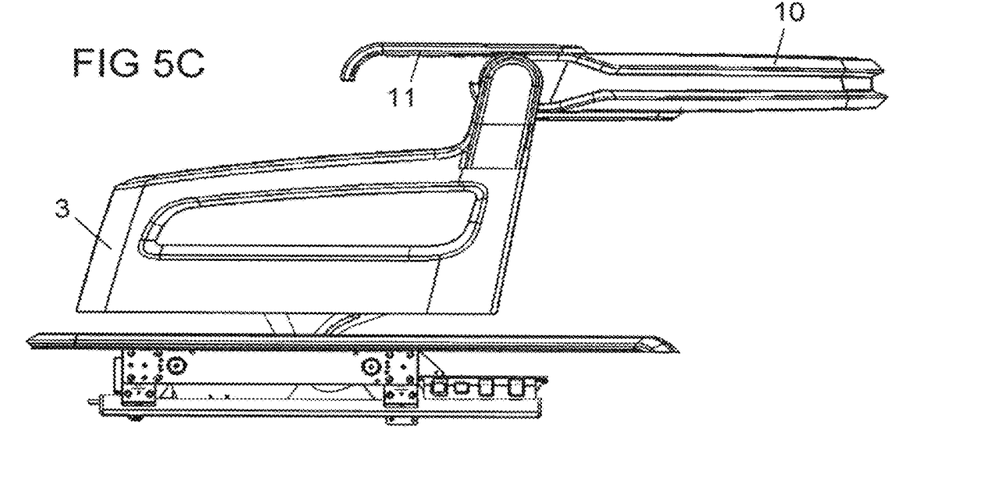

FIGS. 5A to 5C show the armrest 1 in a state mounted on a center console 3 and in the retracted position (FIG. 5A), in an intermediate position (FIG. 5B) and in the extended position (FIG. 5C). The center console 3 in the present case can be mounted on a vehicle floor between two vehicle seats, for example between a driver's seat and a front passenger seat, that is to say in particular in the foremost row of seats of a vehicle.

In the position folded towards the rear according to FIGS. 5A-5C, the carrier 10 can serve as a table for passengers in a further row of seats, in particular a second row of seats, generally for passengers in a row of seats behind the center console 3. In order to provide an arm support surface for passengers sitting on the seats next to the center console 3, the arm support element 11 can be extended in the above-described way. Alternatively, for example if there are no passengers sitting on the rear seats, the carrier 10, jointly with the arm support element 11, can also be pivoted at the pivot joint D relative to the adapter 15, in particular can be folded towards the front. The arm support element 11 is then arranged on an underside of the carrier 10, and the opposite side of the carrier serves as an arm support for passengers on seats next to the center console 3.

FIG. 6 shows, in a schematic illustration, a plurality of components of the drive unit 12. The drive motor 120 has a plurality of connections 127A, 127B, in the present case two connections 127A, 127B. By applying a voltage to the connections 127A, 127B, the drive motor 120 can be activated. By producing a short circuit between the connections 127A, 127B, it is possible to produce a braking effect, which counteracts a rotation of a rotor of the drive motor 120 relative to a stator of the drive motor 120. If neither a voltage is applied at the connections 127A, 127B, nor is a short circuit produced, the rotor is then rotatable smoothly relative to the stator by the action of external force.

FIG. 6 also shows a control unit 13, which in the present case represents part of the armrest 1 and is arranged optionally, but not necessarily, on the carrier 10 or on the arm support 11. The control unit 13 comprises a processor 130 and a memory unit 131. The processor 130 is coupled to the memory unit 131 so that it can read data stored in the memory unit and/or can store data in the memory unit. The control unit 13 controls the drive motor 120. The control unit 13 is connected to the connections 127A, 127B of the drive motor 120 and is designed to ensure that the connections 127A, 127B selectively are free from voltage, are supplied with a voltage, or are short-circuited with one another.

The drive motor 120 is operatively connected to the transmission 124 via an input shaft 128 of the transmission 124. The transmission 124 also has an output shaft 129. If the drive motor 120 sets the input shaft 128 into rotation with a certain rotational speed, the output shaft 129 then rotates with a comparatively lower rotational speed. The output shaft 129 is operatively connected to the pinion 122 already mentioned, for example, is fixedly connected thereto. The pinion 122 meshes with the toothed rack 121. A rotation of the output shaft 129 thus causes the pinion 122 to roll over the gearwheel 121.

The transmission 124 is not self-locking. It is thus possible to set the pinion 122 (generally the output shaft 129) into rotation, for example manually. If the drive motor 120 is in the deenergized state, the rotation can then be performed smoothly, so that a user can adjust the arm support element 11 manually relative to the carrier 10. If the drive motor 120 is short-circuited, such a manual adjustment is then braked and a (much) greater force is necessary in order to adjust the arm support 11 manually relative to the carrier 10. The arm support element 11 can thus be prevented from being adjusted unintentionally.

The armrest 1 further comprises a sensor device 14 for detecting an adjustment, in particular a manual adjustment of the arm support element 11 relative to the carrier 10 and/or a force acting on the arm support element 11.

Figure 7:
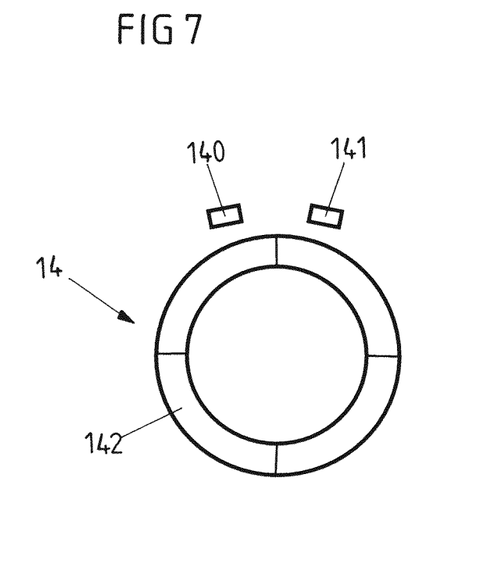
FIG. 7 a sensor assembly of the armrest according to FIGS. 1A to 5C.

FIG. 7 shows a possible embodiment of such a sensor device 14. The sensor device 14 comprises two Hall sensors 140, 141. A magnetic field can be measured by each of the Hall sensors 140, 141. The sensor device 14 further comprises a pole wheel 142 with at least one magnet. In the present case, the pole wheel 142 comprises two magnets, specifically two permanent magnets. The magnets are arranged such that magnetic north poles and south poles alternate circumferentially. The Hall sensors 140, 141 are arranged adjacently to the pole wheel 142, but offset in relation to one another as seen in the circumferential direction around the pole wheel 142. The offset has a smaller angle than the offset between two adjacent boundaries between two magnetic poles. The Hall sensors 140, 141 can thus determine both the rotational speed of the pole wheel 142 (via the frequency of change of the detected magnetic poles) and the rotational direction (via the sequence of the signals of the Hall sensors 140, 141). The two Hall sensors 140, 141 can be combined structurally to form a double Hall sensor.

The pole wheel 142 is fastened for example to a rotatable part of the drive unit 12, for example to the input shaft 128 (see for example FIG. 4 for a possible arrangement. Alternatively, the pole wheel is formed by a part of the drive motor 120.

The control unit 13 is connected to the Hall sensors 140, 141 and can thus determine the adjustment direction and adjustment speed of the arm support element 11 relevant to the carrier 10. On this basis, the control unit 13 can in turn determine the absolute relative position of the arm support element 11 relative to the carrier 10. Contact against one of the end stops 126 can serve as a reference point (there, no adjustment is detected in spite of applied voltage). The control unit 13 can in this way detect the current position (and movement) of the arm support element 11 relative to the carrier 10, more specifically regardless of whether it is or has been adjusted manually or by using a motor.

The control unit 13 is in the present case also designed to control the drive motor 120 in a predetermined or predeterminable manner depending on predetermined or predeterminable conditions.

If the control unit 13 produces a short circuit of the drive motor 120 and at the same time detects a movement of the arm support element 11 relative to the carrier 10 (in particular above a threshold value for a length and/or speed of the movement), it can then cancel the short circuit in order to allow a smooth manual adjustment. The control unit 13 optionally initiates the short circuit in response to the receipt of a signal from a force sensor.

Furthermore, the predetermined event can be the actuation of a button and/or the receipt of a control signal. In response, the control unit 13 triggers the short circuit and/or moves the arm support element 11 by corresponding control of the drive motor 120 into a predetermined position (in particular pre-settable by a user) relative to the carrier 10.

The predetermined position is stored in the memory unit 131. The plurality of different positions are optionally stored in the memory unit 131 and for example are or can be linked to various predetermined positions.

A further possible condition is for example the expiry of a predetermined period of time.

Furthermore, such a condition may be constituted by the detection of a manual adjustment. For example, a brief pull or press on the arm support element 11 (generally an action of force on the arm support element 11) can prompt the control device 13 to adjust the arm support element 11 into a specific position relative to the carrier 10, in particular, into an end position. This allows a particularly intuitive adjustment.

Figure 8A:
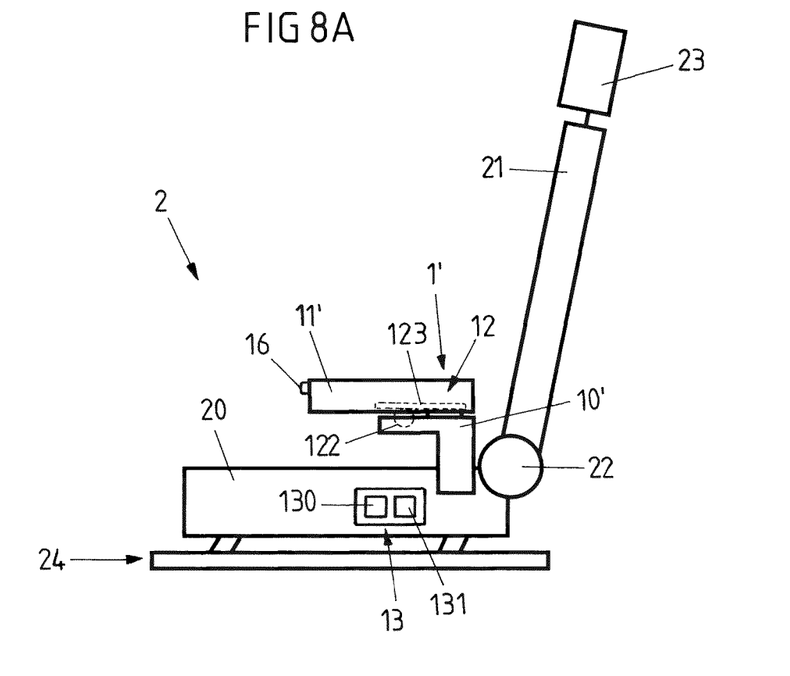
FIG. 8A a vehicle seat with an armrest that has a carrier and an arm support element, wherein the arm support element is shown in a retracted position.

FIG. 8A shows a vehicle seat 2 with a seat part 20 and backrest part 21. A seat user may be seated on the vehicle seat 2. The backrest 21 is in the present case pivotable relative to the seat part 20 by means of adjustment fittings 22 adjustable in motor-driven fashion. Furthermore, a headrest 23 is mounted on the backrest 21 and is adjustable in motor-driven fashion relative to the backrest 21. The vehicle seat 2 has connection elements for fastening to a vehicle floor of a vehicle. In the present case, the vehicle seat 2 comprises a longitudinal adjustment device 21 adjustable in motor-driven fashion. The longitudinal adjustment device 24, with the vehicle seat 2 being oriented along the vehicle longitudinal axis X, allows an adjustment forwards and backwards along the vehicle longitudinal axis X (and provides the stated connection elements).

The vehicle seat 2 has an adjustable armrest 1'. The armrest 1' comprises a carrier 10' and an arm support element 11. The carrier 10' is fastened to the vehicle seat 2, in the present case to the seat part 20. Specifically, the carrier 10' is fastened to a supporting part of the seat part 20, for example to a part of the seat frame.

In order to adjust the armrest 1', the armrest 1' comprises a drive unit 12. The operating function of the drive unit 12 corresponds to that of the drive unit 12 of the armrest 1 explained with reference to FIGS. 1A to 7. The toothed rack 123 and the pinion 122 rotatably mounted on a carrier 10' and meshing with the toothed rack 123 are shown schematically in FIG. 8A by dashed lines.

Furthermore, the control unit 13 is shown in FIG. 8A. The control unit 13 is connected electrically and/or communicatively to the armrest 1', in the present case with the drive motor 120. The control unit 13 is mounted here on the seat part 20, wherein it can be provided alternatively that the control unit 13 is mounted on another part of the armrest 1', for example on the carrier 10'. The control unit 13 can optionally also control other motors of the vehicle seat 2, in particular motors of the adjustment fittings 22, of the headrest 23 and/or of the longitudinal adjustment device 24. In a further alternative embodiment it is provided that the control unit 13 is arranged at a distance from the vehicle seat 2 and/or represents a central control unit which controls the further vehicle functions, in particular at least one function of another vehicle seat and/or another component of the vehicle. Alternatively, the control unit 13 is communicatively connected to a central control unit of this kind.

The control device 13 is optionally designed to adjust the arm support element 11' relative to the carrier 10' at the same time or, in a predetermined manner, with a time delay and to adjust a further adjustment unit that can be adjusted in motor-driven fashion, for example the adjustment fittings 22, the headrest 23 and/or the longitudinal adjustment device 24.

Figure 8B:
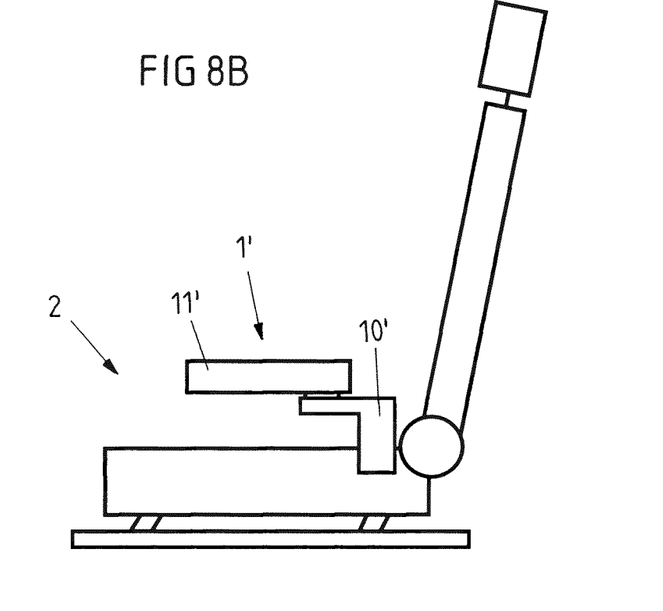
FIG. 8B the vehicle seat according to FIG. 8A, wherein the arm support element is shown in an extended position.

Whereas FIG. 8A shows a retracted position of the arm support element 11 relative to the carrier 10, FIG. 8B shows an extended position.

Figure 9:
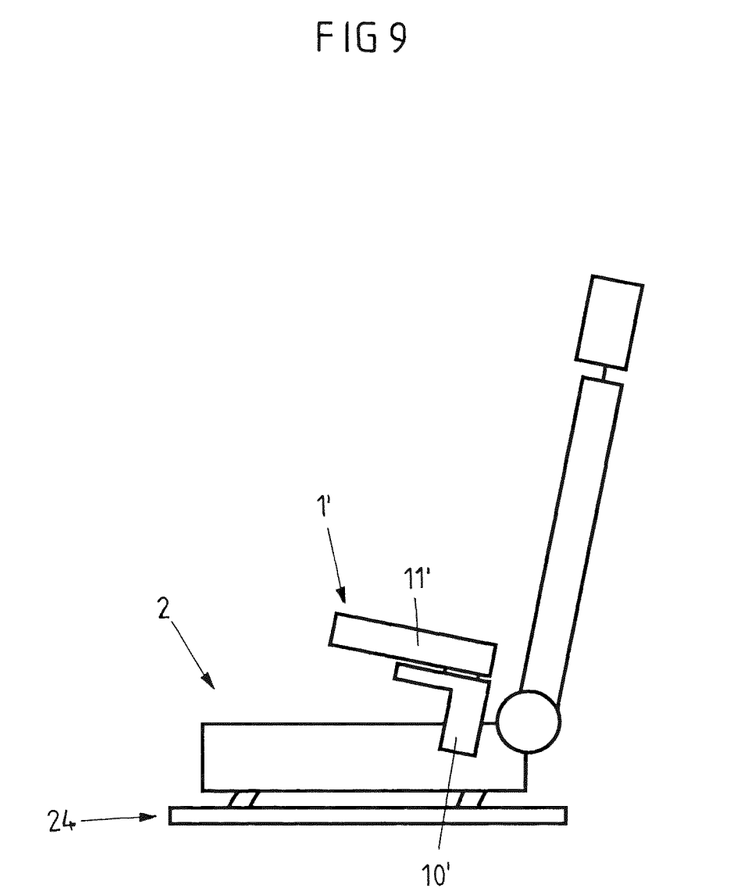
FIG. 9 a vehicle seat corresponding to the vehicle seat according to FIG. 8A, wherein the armrest is oriented in a manner inclined relative to a seat surface of the vehicle seat.

FIG. 9 shows the vehicle seat 2 and the armrest 1' according to FIG. 8A, wherein the armrest 1' is oriented at an incline to the adjustment direction of the longitudinal adjustment device 24 (to the vehicle longitudinal axis X). In this orientation, a height adjustment is effected simultaneously with a longitudinal adjustment of the arm support element 11 relative to the carrier 10.

According to FIGS. 8A and 8B, a parallel orientation of the arm support element 11 to the adjustment direction of the longitudinal adjustment device is provided by contrast, so that an adjustment of the arm support element 11 relative to the carrier 10 does not result in a change to the height of the arm support element 11. In both cases, the armrest 1' allows a longitudinal adjustment of the arm support element 11'.

The vehicle seat 2 according to FIGS. 8A-9 is in the present case in each case an individual seat by way of example, however, the armrest 1' is also usable for a vehicle seat having a plurality of seat spaces.

The armrest has been described above by way of example with reference to the vehicle seat 2 and the (center) console 3, however, it is noted that the armrest 1 can also be arranged and/or mounted at other locations, for example on a vehicle door. It is further noted that the described solution is not limited to armrests, but can be applied to all applications in the interior space, for example for drawers, storage compartments, stowage compartments, etc. Accordingly, a module for a vehicle interior is generally provided, comprising a carrier (for example with a compartment) and an element that is adjustable relative to the carrier (for example in order to close the compartment), wherein a drive unit with a drive motor is provided and is activatable for motor-driven adjustment of the element relative to the carrier, wherein the drive unit is designed such that the element is adjustable (in particular in translation) relative to the carrier both using a motor and manually. In particular, the drive unit of the module can be designed accordingly to the drive unit 12 of the armrest 1;1' described herein.

Figure 10A:
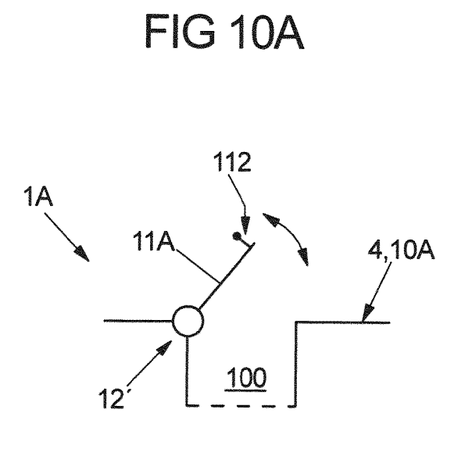
FIGS. 10A-10C further rest devices.

FIG. 10A shows a rest device in the form of a storage compartment 1A. The storage compartment 1A comprises a carrier 10A, which in the present case is formed by a vehicle interior trim 4. The vehicle interior trim 4 is for example an instrument panel or a center console of a vehicle or at least part thereof.

The carrier 10A forms a compartment 100, into which one or more objects can be placed. The compartment 100 is selectively closable or releasable by an element (for example in the form of a lid) formed as a covering element 11A. To this end, the storage compartment 1A comprises a drive unit 12'. The covering element 11A is pivotable relative to the carrier 10A about a pivot axis by means of the drive unit 12', more specifically in the present case between a closed position closing the compartment 100 and an open position releasing the compartment. One or more intermediate positions can optionally be set between the closed position and the open position.

The drive unit 12' is formed similarly to the drive unit 12 according to FIG. 6, wherein instead of a toothed rack 121, for example a gearwheel or an arcuate toothed segment is provided, in order to thus effect, jointly with the pinion 122, a pivoting movement, as shown in FIG. 10A.

The covering element 11B can thus be adjusted relative to the carrier 10A selectively using an electric motor or manually (regarding the rest of the operating principle of the drive unit 12, for example the provision and setting of stored positions and the time control, reference is made to the comments above in order to avoid repetitions). A (optional) grip 112 is attached to the covering element 11A in order to facilitate manual adjustment.

It goes without saying that the compartment 100, as in FIG. 10A, can be opened upwardly or alternatively can be opened to one side.

Figure 10B:
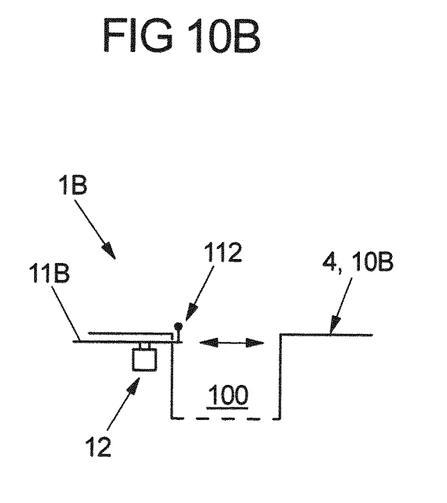

FIG. 10B shows a further rest device in the form of a storage compartment 1B. The storage compartment 1B comprises a carrier 10B, which in the present example is formed accordingly to FIG. 10A by a vehicle interior trim 4. The storage compartment 1B further comprises an element in the form of a covering element 11B to close and release a compartment 100 formed by the carrier 11B.

In contrast to the storage compartment 1A according to FIG. 10A, the covering element 11B is not pivotable relative to the carrier 10B, but instead is displaceable linearly along a longitudinal axis relative thereto, that is to say is adjustable in translation. To this end, the storage compartment 1A comprises a drive unit, for example the drive unit 12 according to FIG. 6. For example, the toothed rack 121 of the drive unit 12 is fixed to the covering element 11B.

Both in FIG. 10A and in FIG. 10B, a bottom of the corresponding compartment 100 is shown by way of a dashed line. This is intended to illustrate that the compartment 100 in question can have a bottom of this kind, but in alternative embodiments it can be provided that such a bottom is not formed. For example, the relevant carrier 10A, 10B can also be, instead of a vehicle interior trim 4, part of a furniture item, garden furniture item, kitchen furniture item, built-in kitchen or a wall, for example a building wall. The covering element 11A, 11B can thus alternatively also be for example a door, for example a cupboard door or a door for people. The carrier can also be part of an aircraft or spacecraft, in particular an interior trim part thereof.

Figure 10C:
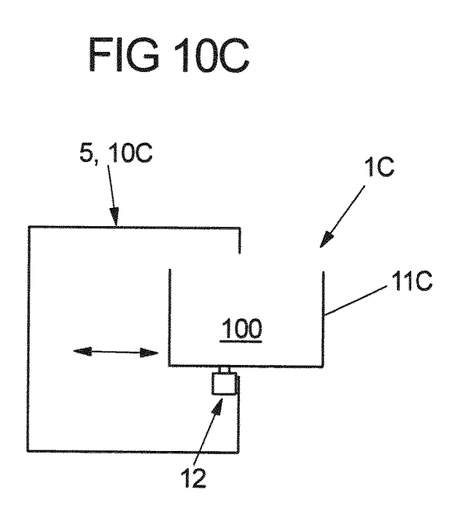

FIG. 10C shows a rest device in the form of a drawer device 1C. The drawer device 1C comprises a carrier 10C, which in the present case is formed by a furniture item 5, for example a cupboard or the like (alternatively by a vehicle interior trim 4). The drawer device 1C comprises an element in the form of a drawer element 11C, which forms a compartment 100. The drawer element 11C (which can also be referred to as a drawer for short) is retractable linearly into an interior defined by the furniture item 5, so that the compartment 100 is not accessible from outside the furniture item 5, and can be extended in the opposite direction to such an extent that the compartment 100 is accessible from outside, for example in order to place and/or remove objects in/from the drawer.

The drawer device 1C comprises the drive unit 12 according to FIG. 6, so that the drawer element 11C is retractable and extendable selectively manually and using an electric motor. Reference is made here again to the above explanations.

Figure 11:
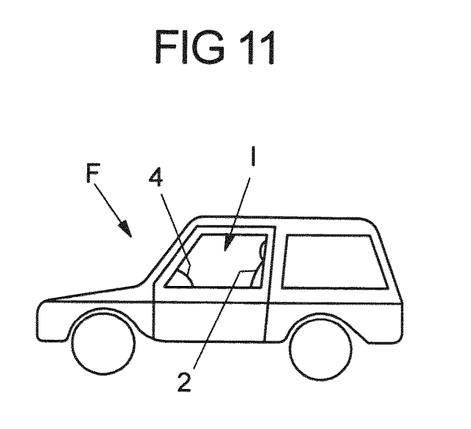
FIG. 11 a vehicle.

FIG. 11 shows a vehicle F with a vehicle interior, in which there is installed a vehicle interior trim 4. This can be the vehicle interior trim 4 mentioned at various points above which comprises one or more of the rest devices 1A-1C described in this context. Alternatively or additionally, the vehicle F comprises a vehicle seat 2 according to any embodiment described herein and/or an armrest 1;1' according to any embodiment described herein.

The drive unit 12;12' can thus be used to allow a selectively manual or electric-motor-driven adjustment of a stowage compartment, a tray, a storage compartment, a sliding door, a door, a cover, a support surface or a drawer, more specifically in particular for a vehicle interior, an interior of an aircraft of spacecraft or in a building, alternatively in a garden (in particular in the case of a furniture item, a kitchen element, etc.).

In all of these applications, it is possible by use of the drive unit 12;12' to effect an adjustment manually and selectively electrically. An electrical adjustment command can be input or triggered in a time-controlled fashion for example by button. Here, as a result of the adjustment command, a predetermined setting position can be assumed, for example a stored position, in particular the last (prior to manual actuation) electrically assumed position. The adjustment command can also be input by tapping on, pushing against or pulling on the relevant element 11A-11C. For example, a push-to-close function can be provided as a result. The drive motor 120 is locked and unlocked preferably electrically, in particular by a closing and opening respectively of a short circuit at the drive motor 120.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1; 1' rest device (armrest)
1A, 1B rest device (storage compartment)
1C rest device (drawer device)
10; 10', 10A-10C carrier
100 compartment
11; 11' element (arm support element)
11A; 11B element (covering element)
11C element (drawer element)
110 support surface
111 curvature
112 grip
12; 12' drive unit
120 drive motor
121 toothed rack
122 pinion
123 guide
124 transmission
125 mount
126 end stop
127A, 127B connection
128 input shaft
129 output shaft
13 control unit
130 processor
131 memory unit
14 sensor device
140, 141 Hall sensor
142 pole wheel
15 adapter
16 button
2 vehicle seat
20 seat part
21 backrest part
22 adjustment fitting
23 headrest
24 longitudinal adjustment device
3 center console
4 vehicle interior trim
5 furniture item
D pivot joint
F vehicle
I vehicle interior
L longitudinal axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A rest device for use in a vehicle, the rest device comprising:
a carrier;
an element configured to be adjusted relative to the carrier;
a drive unit including a drive motor configured to be activated to provide motor-driven adjustment of the element relative to the carrier, wherein the drive unit is configured to manually adjust the element and adjust the element relative to the carrier with the drive motor; and
a control unit configured to effect a short circuit between electrical connections of the drive motor,
wherein the control unit is configured to cancel the short circuit in response to the control unit detecting a manual adjustment of the element relative to the carrier and/or a force acting on the element by means of a sensor device configured to detect an adjustment direction and/or an adjustment speed of the element relative to the carrier or the force acting on the element.

2. The rest device of claim 1, wherein the sensor device includes two Hall sensors.

3. The rest device of claim 1, further comprising:
a control unit provided with a memory unit configured to store an adjustment position of the element relative to the carrier.

4. The rest device of claim 3, wherein the control unit is configured to, responsive to a predetermined condition and activation of the drive motor,
set an adjustment position of the element relative to the carrier, and
store the adjustment position in the memory unit.

5. The rest device of claim 1, further comprising:
a control unit configured to, responsive to identifying a manual adjustment of the element relative to the carrier, activate the drive motor.

6. The rest device of claim 1, wherein the element is configured to close a compartment in a first position relative to the carrier and open the compartment in a second position relative to the carrier.

7. The rest device of claim 1, wherein the drive unit includes a transmission and an output shaft, the transmission is operatively connected to the drive motor via an input shaft, and the output shaft is rotatable when the drive motor is deenergized.

8. The rest device of claim 1, wherein the element is adjustable to translate relative to the carrier.

9. The rest device of claim 1, wherein the drive unit includes a toothed rack.

10. The rest device of claim 1, wherein the rest device is an armrest, and the element is an arm support element.

11. The rest device of claim 10, wherein the arm support element includes an elongate support surface extending longitudinally along a longitudinal axis to support a resting arm, wherein the arm support element is adjustable relative to the carrier in a direction parallel to the longitudinal axis.

12. An assembly comprising:
a vehicle seat; and
the rest device of claim 1, wherein the rest device forms an armrest.

13. An adjustment device comprising:
a carrier;
an element configured to be adjusted and translate relative to the carrier;
a drive unit including a drive motor configured be activated to adjust the element relative to the carrier, wherein the drive unit is configured to manually adjust the element and adjust the element by the drive motor; and
a control unit configured to effect a short circuit between electrical connections of the drive motor,
wherein the control unit is configured to cancel the short circuit in response to the control unit detecting a manual adjustment of the element relative to the carrier and/or a force acting on the element by means of a sensor device configured to detect an adjustment direction and/or an adjustment speed of the element relative to the carrier or the force acting on the element.

* * * * *